March 22, 1960  F. W. HENNING, JR., ET AL  2,929,203
AFTERBURNING BYPASS AVIATION TURBOJET ENGINE
Filed Aug. 31, 1956

INVENTORS
FREDERICK W. HENNING JR,
CHARLES T. LEVINSKY
BY
ATTORNEY

United States Patent Office 2,929,203
Patented Mar. 22, 1960

2,929,203

AFTERBURNING BYPASS AVIATION TURBOJET ENGINE

Frederick W. Henning, Jr., Merriam, Kans., and Charles T. Levinsky, Alameda, Calif., assignors to Westinghouse Electric Corporation, East Pittsburgh, Pa., a corporation of Pennsylvania Application August 31, 1956, Serial No. 607,517

3 Claims. (Cl. 60—35.6)

This invention relates to aviation turbojet engines of the bypass duct type, more particularly to a bypass aviation turbojet engine equipped with afterburner structure and has for an object to provide improved apparatus of this type.

In bypass aviation turbojet engines of the "mixed exhaust" type, wherein the bypass air is mixed with the turbine exhaust gases before ejection through a common exhaust nozzle for jet propulsion, some of the major problems encountered are maintenance of adequate stability and efficiency in the bypass air stream, accommodation of the wide range of bypass air pressure/turbine discharge gas pressure ratios and bypass air velocity/turbine exhaust gas velocity ratios, and mixing of the two fluid streams in the engine exhaust casing.

In a "mixed exhaust" type bypass aviation turbojet engine equipped with an afterburner, the afterburner is required to reheat the turbine discharge gases as well as by the bypass air. Such an afterburner must be able to adequately accommodate two merging fluid streams having relative velocity, mass fluid flow, pressure and temperature values which vary with flight conditions. For example, with increasing flight Mach number (flight velocity/speed of sound) the following changes take place at the mixing plane of the two fluid streams:

(1) The ratio of bypass to turbine discharge mass fluid flow increases.

(2) The ratio of bypass to turbine discharge total pressure increases.

(3) The temperature of the bypass air increases while temperature of the turbine discharge gases remains substantially constant.

(4) The Mach number of the bypass air stream increases and that of the turbine discharge gas stream decreases.

The above variable conditions may render impossible or at least adversely affect fuel combustion in the bypass air stream at Mach number flight conditions substantially exceeding the design point.

In view of the above, it is a further object of the invention to provide a bypass turbojet engine of the "mixed exhaust" type equipped with afterburners which may be reliably and efficiently operated through a wide range of flight conditions.

In accordance with the invention, a bypass turbojet engine of the "mixed exhaust" type is provided with a tubular partition disposed within the outer casing of the engine in the afterburner section in a manner to provide an annular continuation of the bypass duct. The partition is shaped and arranged to act as a diffuser for the bypass air stream. That is, it defines with the outer casing an annular passageways of increasing cross-section in downstream direction to decrease the velocity of the bypass air stream. The partition is in substantial alignment with and spaced axially from the inner casing of the engine, so that an annular communicating passageway is provided between the turbine discharge passageway and the bypass passageway permitting stabilizing exchange of fluid between the passageways. With this arrangement, the conditions mentioned above under items (1)–(4) are corrected at high flight Mach numbers to permit more efficient and stable afterburning.

Upstream of the communicating passageway, means for injecting fuel into the bypass duct and turbine discharge passageway is provided. With this arrangement, the fuel and air mixture is unaltered by subsequent fluid exchange through the communicating passageway.

A pilot fuel burner disposed at the downstream end of the central fairing cone is also provided together with "swept-back" flame holders to provide transverse flow of the burning pilot gases toward the outer casing.

These and other objects are effected by the invention as will be apparent from the following description and claims taken in connection with the accompanying drawings, forming a part of this application, in which:

Figure 1:
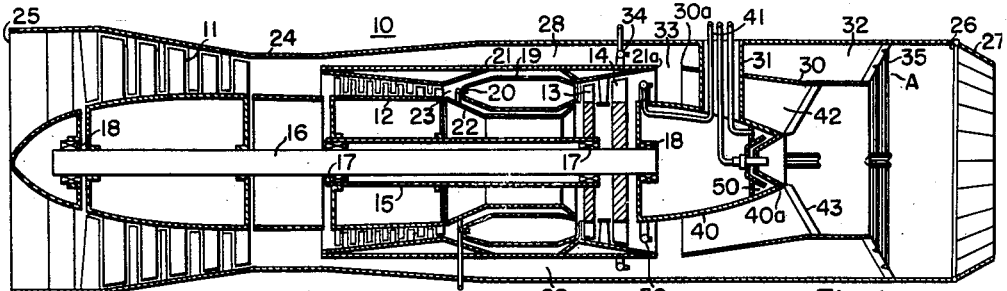
Fig. 1 is a schematic axial sectional view of a bypass turbojet engine having an afterburner formed in accordance with the invention.
Figure 2:
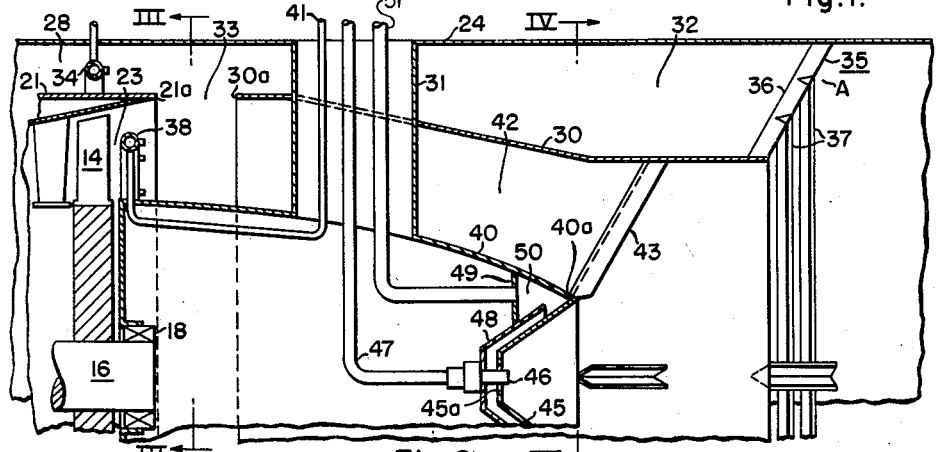
Fig. 2 is an enlarged fragmentary axial sectional view showing the afterburner construction of Fig. 1.
Figure 3:
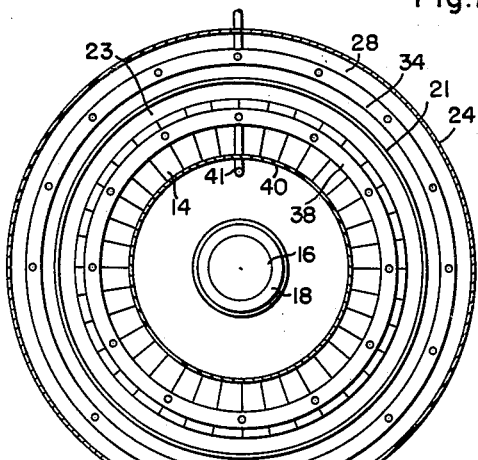
Fig. 3 is a cross-sectional view taken on line III—III of Fig. 2, looking in the direction of the arrows.
Figure 4:
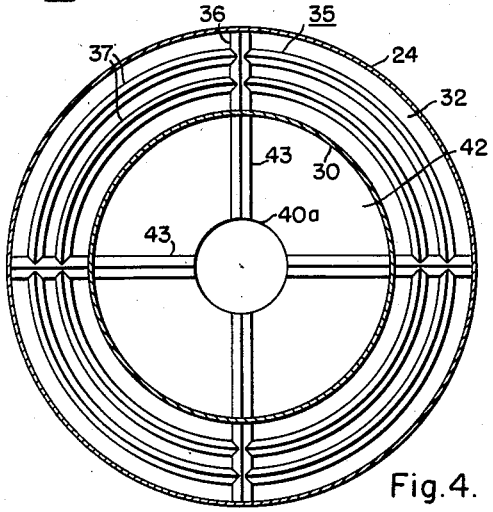
Fig. 4 is a cross-sectional view taken in line IV—IV of Fig. 2, looking in the direction of the arrows.

Referring to the drawing in detail, especially Fig. 1, there is shown an aviation bypass turbojet engine, generally designated 10, of the "twin-spool" type having a low-pressure compressor rotor 11, a high pressure compressor rotor 12, a high pressure turbine rotor 13 and a low pressure turbine rotor 14, disposed in axial alignment with each other. The high pressure turbine rotor 13 is connected to the high pressure compressor rotor 12 by a hollow shaft 15 through which extends an inner shaft 16 connecting the low pressure turbine rotor 14 to the low pressure compressor rotor 11. The shafts 15 and 16 are supported by suitable bearings 17 and 18 for independent rotation.

Between the high pressure compressor rotor 12 and the high pressure turbine rotor 13 there is interposed a primary fuel combustion structure 19, provided with suitable fuel injecting means 20 and fuel ignition means (not shown), as well known in the art.

The high pressure compressor rotor 12, the primary combustion structure 19 and the turbine rotors 13 and 14 are received within a tubular central shell structure 21, which together with concentric inner core structure 22 provides a central annular passageway 23 for flow of gases.

The low pressure compressor rotor 11 is received within an elongated outer tubular shell structure 24, encompassing the central shell structure 21 and providing an air inlet 25 and an exhaust nozzle 26. Suitable structure 27 for varying the area of the exhaust nozzle 26 is provided for well known reasons. As illustrated, the nozzle area varying structure 27 may be of the well known movable leaf type actuated automatically in response to selected engine parameters by actuating mechanism (not shown).

The outer shell 24 is of larger diameter than the central shell 21 and together therewith defines an annular bypass duct or passageway 28 which is in communication with the discharge end of the low pressure compressor rotor 11.

Thus, as well known in the art, air admitted to the engine through the inlet 25 is subjected to succeeding stages of compression by the low and high pressure compressor rotors 11 and 12 and then combined with fuel in the primary combustion structure 19 to provide highly heated air and gaseous products of combustion for driving the turbine rotors 13 and 14. The turbine rotors 13 and 14, in turn, drive the compressor rotors 12 and 11, respectively. The gases discharged by the low pressure turbine rotor are than ejected to the atmosphere through the exhaust nozzle 26 to provide a propulsive thrust, as well known in the art.

It will be noted that some of the compressed air from the low pressure compressor rotor 11 flows through the bypass duct 28 and joins the hot discharge gases upstream of the exhaust nozzle 26, mixing therewith before final ejection. Since no work is extracted from the air stream flowing through the bypass duct, its mass flow, pressure, velocity and temperature characteristics differ from those of the exhaust gases from the turbine rotor 14, and vary with flight conditions, so that heretofore, in engines of the above described type, afterburners have been found to be inadequate and unreliable in operation through a wide range of flight conditions.

In accordance with the invention, a tubular partition member 30 is disposed downstream of the central shell 24 and supported in an axial position within the outer shell 24 by a plurality of struts 31 (only one shown). The partition member 30 together with the outer shell defines an annular passageway 32 acting as a continuation of the bypass duct 28 and is of generally frustoconical shape to impart a cross-section of increasing area in downstream direction to said continuation passageway. With this arrangement, fluid flowing therethrough is diffused with attendant increase in pressure and decrease in velocity.

The partition member 30 has an upstream edge portion 30a which is axially spaced from the downstream edge portion 21a of the central shell 21, the two edges thereby defining an annular communicating opening 33 permitting interchange of fluid between the bypass duct 28 and the central passageway 23.

A fuel injection manifold 34, which may be of the annular type illustrated, is disposed in the bypass duct 28 immediately upstream of the communicating opening 33 and in encompassing relation with the central shell 21. The downstream edge of the partition 30 defines a mixing zone A for the fluid streams flowing through passageways 32 and 42, and adjacent thereto flameholding structure 35 is provided comprising a plurality of radial members 36 extending to the outer shell 24 and a plurality of annular members 37 supported by the radial members at their cross-over points. The members 36 and 37 are preferably of V-shaped cross-section and the radial members 36 are "swept-back" in outward direction for a purpose which will be described subsequently.

Within the central passageway 23 and immediately upstream of the communicating opening 33 another annular fuel injection manifold 38 is provided. The fuel injection manifold 38 is disposed in encompassing relation with an axially aligned central fairing member 40 of substantially frusto-conical shape, and is supplied with fuel by a fuel conduit 41 extending through the fairing member 40 and one of the struts 31.

The fairing member 40 is encompassed by the partition member 30 and together therewith defines an annular passageway 42 acting as a continuation of the central passageway 23. The fairing member is preferably shaped in a manner to impart a cross-section of substantially uniform area to the continuation passageway 42, so that gases flowing therethrough undergo little or no diffusion.

A plurality of "swept-back" radial flameholding members 43 of V-shaped cross-section extend from the downstream edge 40a of the fairing member 40 to the partition 30. As illustrated, the flameholding members 43 are located axially forward of the flameholder 35.

The fairing member 40 has an inverted frustoconical end closure member 45 provided with an axially disposed pilot fuel injection nozzle 46. The pilot fuel injection nozzle is connected to a fuel supply conduit 47 received in the strut 31. An inner cup shaped member 48, disposed in spaced axial alignment with the closure member 45, and an annular wall member 49 define, together with the fairing member 40 and the closure member 45, an air chamber 50 to which compressed air from any suitable source is admitted by an air supply conduit 51. Between the pilot fuel injection nozzle 46 and the end closure member 45, an annular opening 45a is provided, so that the air from the chamber 50 may exit therefrom to atomize fuel issuing from the fuel injection nozzle.

In operation, fuel is injected by the fuel injection manifold 38 into the central passageway 23 and mixed with the turbine discharge gases. Also fuel is admitted by the fuel injection manifold 34 into the bypass duct 28 and mixed with the air stream flowing therethrough. Hence, even though an interchange of fluid is effected subsequent to the fuel admission, through the communicating passageway 33, the ratio of the fuel and air mixture is unaltered by such interchange.

At low flight speeds at sea level, the pressure and mass flow of fluid through the turbine exhaust passageway is slightly larger than the mass flow of air through the bypass duct 28, so that a small portion of the turbine exhaust gases are directed through the communicating passageway 33. Thus, the ratio of bypass fluid to turbine discharge fluid flowing through the continuation passageways 32 and 42, respectively, is substantially maintained at unity. Also, the pressure ratio of the two fluid streams is substantially maintained at unity in the mixing zone A.

At the design flight speed point of the engine, the pressure and mass flow of the fluids in the two streams is substantially the same, so that substantially no interchange of fluid is effected through the communicating passageway 33.

With increasing flight speeds, the pressure and mass flow of the bypass air stream increases above that of the turbine exhaust gases. During such conditions, a part of the air stream is directed into the bypass continuation passageway 32 from the central passageway 23 in order to maintain static pressure balance at the downstream end of the partition 30 in the mixing zone A. The resulting large total pressure losses as well as the diffusion of the fluid stream occurring in the bypass continuation passageway 32 results in a lowering of the velocity and Mach number of this stream at the mixing zone A to a value which is satisfactory for combustion, even at high flight Mach numbers (for example on the order of Mach 2).

The radial "swept-back" flame-holding members 43 serve to induce the burning gases to flow outwardly from the pilot injection nozzle 46, thereby increasing the combustion efficiency and stability in the central continuation passageway 42. In the same manner, the radial "swept-back" flame holding members 36 induce a flow of burning gases outwardly from the central continuation passageway 42, thereby increasing the combustion efficiency and stability in the bypass continuation passageway 32.

Combustion in the central continuation passageway 42, is well established before combustion is initiated in the bypass continuation passageway 32, thus providing heat to the relatively cool bypass air stream before combustion is effected.

Figure 5:
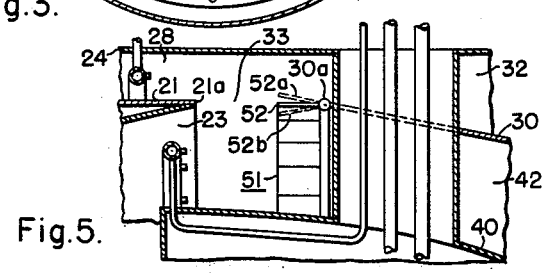
Fig. 5 is a view similar to Fig. 2 but on a smaller scale, illustrating a modified arrangement.

In Fig. 5 another embodiment of the invention is shown similar to the first embodiment and differing therefrom in that the upstream edge 30a of the partition member 30 is provided with an adjustable deflector 51 having an annular array of jointly movable leaf members 52 movable between the dotted line positions 52a and 52b. In the position 52a, the leaves extend radially outwardly of the downstream edge 21a of the central shell 21, while in the position 52b the leaves extend radially inwardly of the edge 21a. The deflector 51 may be automatically adjusted by suitable mechanism (not shown) responsive to one or more selected engine parameters.

With this arrangement, at low flight speeds the leaves 52 are disposed in the position 52b to deflect a portion of the turbine exhaust gases from the central passageway 23 through the communicating passageway 33 to balance the fluid values of the fluid stream in the central continuation passageway 42 and in the bypass continuation passageway 32.

With increasing flight speed, the leaves are moved in small increments toward their outer position 52a to maintain the two fluid streams in balance until at very high flight speed (for example Mach 3) the leaves assume their maximum outer position 52a.

It will be noted that as the leaves 52 are moved outwardly the proportion of turbine exhaust gas directed through the passageway 33 is gradually reduced, to maintain the fluid balance required for combustion.

While the invention has been shown in several forms, it will be obvious to those skilled in the art that it is not so limited, but is susceptible of various other changes and modifications without departing from the spirit thereof.

What is claimed is:

1. In a bypass aviation turbojet engine having a core member and tubular inner wall structure jointly defining an annular primary exhaust fluid passageway, and tubular outer wall structure encompassing said inner wall structure and together therewith defining an annular secondary fluid passageway; a tubular partition disposed downstream of and in substantially axial alignment with said inner wall structure, said partition being disposed in radially spaced relation with said outer wall structure and defining therewith a continuation of said secondary passageway, said outer wall structure extending in downstream direction beyond said partition, said partition having an upstream edge portion and said inner wall structure having a downstream edge portion spaced axially from said upstream edge portion and together forming an annular communication between said primary and secondary passageways, whereby to permit interchange of fluid therebetween, and afterburner structure comprising first fuel injection structure disposed in said primary fluid passageway and second fuel injection structure disposed in said secondary fluid passageway, said first and second fuel injection structures being disposed upstream of said annular communication.

2. In a bypass aviation turbojet engine of the mixed exhaust type having outer tubular wall structure open at both ends and defining an air inlet at one end and a fluid exhaust nozzle at the other end, tubular inner wall structure defining with said outer wall structure a bypass duct, a turbine rotor received within said inner wall structure, a core member disposed downstream of said turbine rotor and together with said inner wall structure defining an inner annular fluid passageway for hot motive gases exhausted by said turbine motor; a tubular partition disposed downstream of and in substantially axial alignment with said inner wall structure, said partition being disposed in radially inwardly spaced relation with said outer wall structure and defining therewith a continuation of said bypass duct, said partition having its upstream edge portion disposed in axially spaced relation with the downstream edge portion of said inner wall structure and together therewith forming an annular communicating opening between said inner passageway and said bypass duct continuation, whereby to permit exchange of fluid between said inner passageway and said bypass duct, said partition being formed and disposed in a manner to impart an increasing cross-sectional area to said bypass duct continuation in downstream direction, whereby fluid flowing therethrough is diffused to a pressure and velocity value substantially equal to the pressure and velocity value of the fluid exhausted from said inner passageway, and afterburner structure comprising first fuel injection structure and second fuel injection structure disposed in said inner passageway and said bypass duct, respectively, upstream of said communicating opening.

3. In a bypass aviation turbojet engine of the mixed exhaust type having outer tubular wall structure open at both ends and defining an air inlet at one end and a fluid exhaust nozzle at the other end, tubular inner wall structure defining with said outer wall structure a bypass duct, a turbine rotor received within said inner wall structure, a core member disposed downstream of said turbine rotor and together with said inner wall structure defining an inner annular fluid passageway for hot motive gases exhausted by said turbine motor; a tubular partition disposed downstream of and in substantially axial alignment with said inner wall structure, said partition being disposed in radially inwardly spaced relation with said outer wall structure and defining therewith a continuation of said bypass duct, said partition having its upstream edge portion disposed in axially spaced relation with the downstream edge portion of said inner wall structure and together therewith forming an annular communicating opening between said inner passageway and said bypass duct continuation, whereby to permit exchange of fluid between said inner passageway and said bypass duct, said partition being formed and disposed in a manner to impart an increasing cross-sectional area to said bypass duct continuation in downstream direction, whereby fluid flowing therethrough is diffused to a pressure and velocity value substantially equal to the pressure and velocity value of the fluid exhausted from said inner passageway, afterburner structure comprising first fuel injection structure and second fuel injection structure disposed in said inner passageway and said bypass duct, respectively, upstream of said communicating opening, said core member being of substantially frusto-conical shape and said afterburner structure further including a pilot burner having fuel and oxidant injecting means disposed at the downstream end of the core member, and a flame-holding structure having a plurality of flame-holding members extending radially outwardly from the downstream end of said core, said flame-holding members being disposed with their longitudinal axes in swept-back relation with said core member, whereby to induce burning gases from said pilot burner to flow in radially outward direction.

References Cited in the file of this patent

UNITED STATES PATENTS

| | | |
|---|---|---|
| 2,753,685 | Mattinson | July 10, 1956 |
| 2,847,821 | Brown | Aug. 19, 1958 |

FOREIGN PATENTS

| | | |
|---|---|---|
| 925,984 | Germany | Apr. 4, 1955 |